March 23, 1965 W. R. NELSON 3,174,510
SPOOL TYPE CONTROL VALVE FOR CONTROLLING HYDRAULIC ACTUATORS
Filed April 18, 1961 2 Sheets-Sheet 1
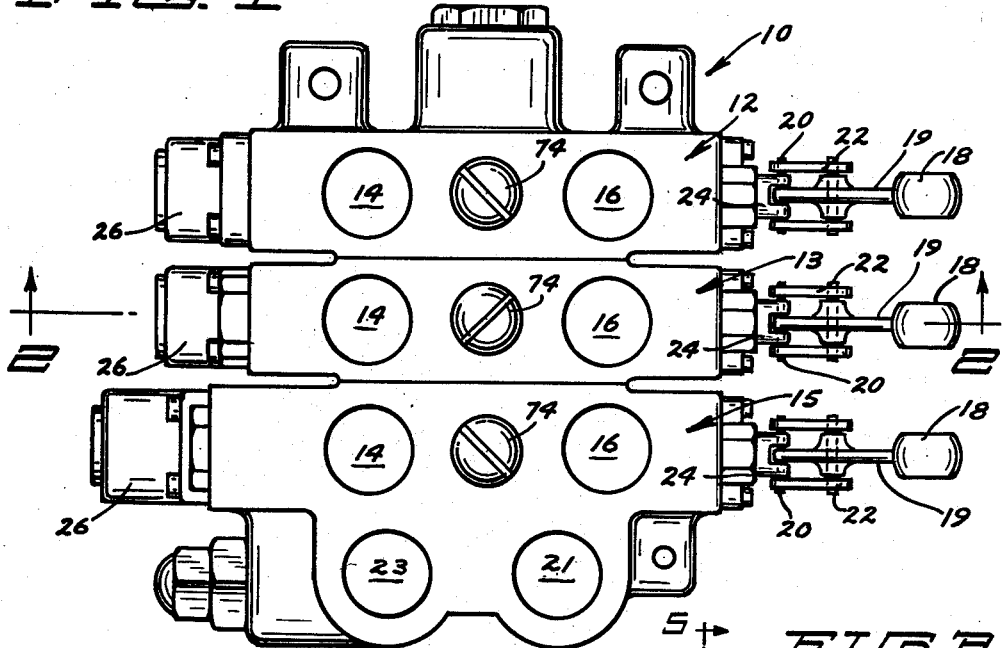
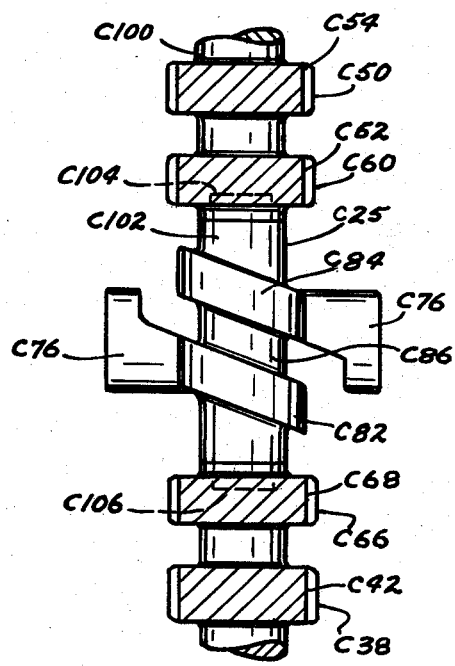
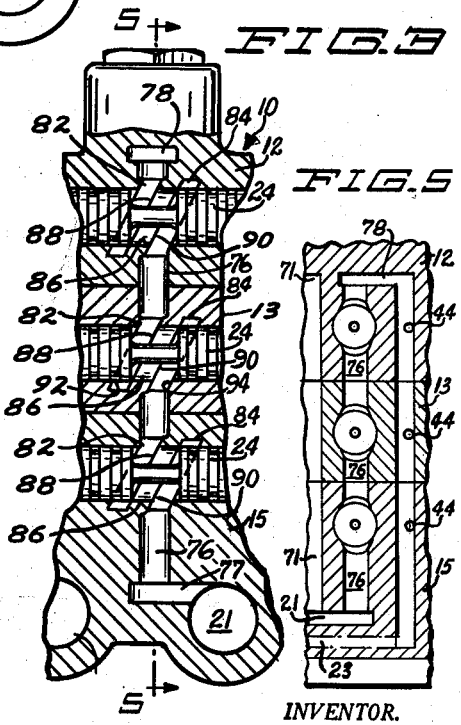
INVENTOR.
WAYNE R. NELSON
BY
Carlsen and Carlsen
ATTORNEYS

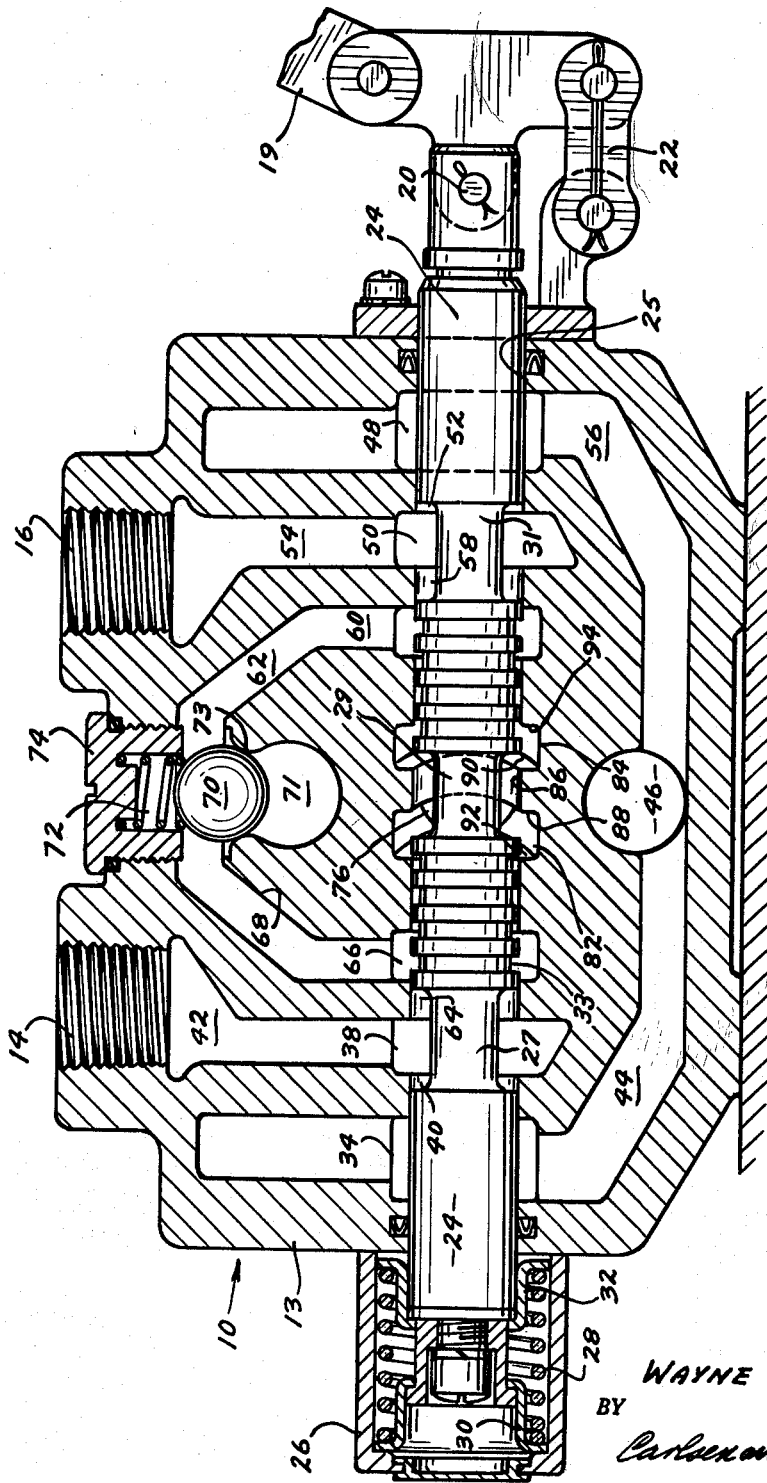

United States Patent Office 3,174,510
Patented Mar. 23, 1965

3,174,510
SPOOL TYPE CONTROL VALVE FOR CONTROL-
LING HYDRAULIC ACTUATORS
Wayne R. Nelson, Fridley, Minn., assignor to Gresen
Manufacturing Company, Minneapolis, Minn., a corporation of Minnesota
Filed Apr. 18, 1961, Ser. No. 103,762
13 Claims. (Cl. 137—625.69)

This invention relates to hydraulic spool type control valves and more particularly to improved metering or flow control provisions for such valves.

Hydraulic control valves for operating hydraulic devices have been in use for many years. Examples of such valves are shown in Patents No. 2,873,762 and No. 2,247,141. Briefly, these valves comprise a casing having at least one bore and a spool slidably mounted in each such bore. Each of the spools is provided with a plurality of circumferential grooves. A plurality of ports are spaced axially along the bore and a plurality of passages in the housing communicating between the ports. As one of the spools is moved axially within the bore, certain of the ports are opened and others are closed, thereby controlling the flow of hydraulic fluid through the valve and in turn causing the movable element of a hydraulic actuator communicating with the valve to move in a selected direction. Appropriate means are often provided in these valves for normally biasing the spool to a central position. Means are also provided in these valves for maintaining the axial and radial hydraulic forces against the spool in balance so that the spool can be easily moved within the bore.

The type of valve described hereinabove has a wide variety of applications. Included among such applications are the operation of hydraulic actuators used on farm machinery, earth moving equipment, highway construction equipment such as graders and tractors, cranes, derricks, power shovels, stationary hydraulic equipment and the like. In many of these applications, it is desirable to begin the movement of the actuator at a relatively slow speed, to provide accurate and reliable control of the speed of the actuator and reliably change the speed of the actuator as desired.

In conventional valves, a certain amount of flow control can be provided by controlling the movement of the spool, but the distance of displacement of the spool over which flow control occurs is relatively short in prior valves of the type described. Therefore, the required speed control is often unobtainable or if it is obtained, it often requires a considerable additional effort and constant attention on the part of the operator.

One provision proposed heretofore for allowing limited amount of speed control by such valves is the placement of a hemispherical recess or beveled edge in a portion of the spool adjacent one of the circumferential grooves of the spool. Such recesses or bevels provide control of the flow through only a very limited distance of movement of the spool. Moreover, particles such as dirt and dust suspended in the hydraulic fluid tend to become lodged between the recess or bevel and valve housing when the valve is closed due to the acute angle of intersection between the recess or bevel and the housing. Such entrapped dirt particles sometimes seriously mar the surface of the housing or the spool.

In another method proposed for providing flow control, the edges of the circumferential recesses of the spool are inclined at a slight angle with respect to the longitudinal axis of the spool. This construction provides satisfactory flow control or metering of the hydraulic fluid passing through the valve but is costly to construct and will ordinarily result in an unbalance of either radial or axial hydraulic pressure against the spool. Furthermore, a substantial additional cost results from the necessity to cut a number of grooves on the spool at an angle to the axis of the spool. In most valves this would require from two to four additional manufacturing operations on each spool.

It is therefore one important object of the present invention to provide an improved hydraulic spool type control valve having means for allowing accurate and reliable flow control or metering of the hydraulic fluid through the valve.

It is another object of this invention to provide an improved valve of the type described wherein a conventional spool may be utilized with no additional machining operations being required.

It is still another object of this invention to provide an improved hydraulic control valve of the type described wherein relatively inexpensive modifications of the valve housing or block produce the desired flow control of hydraulic fluid.

It is still another object of this invention to provide an improved valve of the type described which provides accurate and reliable flow control without causing significant radial or axial pressure unbalance against the spool.

Briefly stated, one preferred embodiment of my invention provides a housing with at least one bore therein. Each such bore has a spool slidably mounted therein and each spool is provided with a plurality of axially spaced apart circumferential recesses. A plurality of annular chambers are spaced axially along the bore and extend radially therefrom. Portions of the bore between said annular chambers comprise ports. A plurality of passages within the housing communicate between these chambers and the valve inlet and outlet ports. At least one of these chambers is inclined at an acute angle with respect to the longitudinal axis of said bore. The edge of the port adjacent said inclined chamber is also inclined at an acute angle with respect to the axis of said bore whereby the side edge of one of the recesses on the spool coacts with the inclined edge of said port causing the port to gradually close as the spool is moved axially in the bore.

These and other more detailed and specific objects will be disclosed in the course of the following specification, reference being had to the accompanying drawings, in which—

FIG. 1 is a plan view of a valve embodying the present invention.

FIG. 2 is a vertical sectional view taken along line 2—2 of FIG. 1.

FIG. 3 is a partial horizontal sectional view of the center portion of the valve of the FIG. 1.

FIG. 4 is a partial horizontal section view taken through the molding core used in forming a valve embodying the present invention.

FIG. 5 is a cross sectional flow diagram taken along the section 5—5 of FIG. 3.

Referring now to the drawings, there is shown a valve 10 including three double acting hydraulic spool type control valves 12, 13 and 15. While the principles of the invention are described in connection with a multiple bank or stack valve including a plurality of separate valves, it will be readily apparent that the invention can also be employed in a single unit valve including a single spool and a single control lever. Each of the valves 12, 13 and 15 are connected in parallel across an inlet port 21 and an outlet port 23 and each of the valves is provided with a pair of actuator ports 14 and 16 which are connected to the ports of a hydraulic actuator (not shown) to be operated by the valve.

As will be explained more fully hereinbelow, hydraulic fluid can be made to pass in either direction through the ports 14 and 16. That is, from either port 14 and to port 16 or in the reverse direction, as desired.

Each of the valves 12, 13 and 15 includes a control means such as a control handle 18 and a control lever 19. The control means is operatively connected to a movable valve element or spool 24 by means of a pivot 20. The lever 19 is also operatively connected to the housing 10 by means of a linkage 22 whereby pivotal movement of the control lever 19 with respect to the housing 10 will move the spool 24 within the housing.

The spool 24 is generally cylindrical in shape and is mounted slidably within a bore 25 which extends through the entire housing such as the housing of valve 13. The spool includes three axially spaced apart circumferential grooves 27, 29 and 31. These grooves provide openings for the flow of hydraulic fluid between passages provided within the housing as will be explained more fully hereinbelow.

A plurality of axially spaced apart shallow grooves 33 can also be provided on the spool if desired.

Each spool is yieldably retained in a central position by means of a resilient member such as spring 28 contained within a housing 26. The left end of spring 28 abuts against the end of a collar 30 while the right end abuts against the end of a collar 32. The collars 30 and 32 are slidably mounted within the housing 26 and slidably mounted on the spool 24 and through the action of spring 28 yieldably retain each of the spools 24 in a central position.

At the left end of each valve such as valve 13 is provided a pair of spaced apart annular chambers 34 and 38. Each of chambers 34 and 38 is concentric with the bore 25 and communicates therewith. Chamber 38 communicates with actuator port 14 through passage 42 and chamber 34 communicates with an outlet passage 46 through a passage 44. A port 40 permits the passage of hydraulic fluid between chambers 34 and 38 when the spool is moved to the left in the figure. A pair of similar chambers 50 and 48 at the right of the valve communicate respectively with the actuator port 16 through a passage 54 and with the outlet passage 46 through a passage 56. When the spool is moved to the right in FIG. 2, hydraulic fluid can pass between the chambers 48 and 50 through valve port 52.

Spaced inwardly of the chamber 38 is an annular valve chamber 66 which communicates through passage 68 with a pressure core opening 71. A port 64 between chambers 38 and 66 allows the passage of hydraulic fluid between chamber 38 and 66 when the spool is moved to the right in the figures.

Another annular chamber 60 is spaced inwardly of chamber 50 and communicates with the pressure core opening 71 through a passage 62. Movement of the spool 24 to the left in the figures permits passage of hydraulic fluid between chambers 50 and 60 through port 58. A ball check valve 70 can be positioned between pressure core opening 71 and passages 62 and 68. The ball check valve is yieldably retained against a seat 73 by means of spring 72. The upper end of spring 72 is secured in position by means of a plug 74.

Each of the valves 12, 13 and 15 also includes a pair of open center chambers 82 and 84 and an open center port 86 communicating between chambers 84 and 82 and it is in these chambers and this port that I provide the improved flow control construction according to the present invention.

As shown in FIGS. 2 and 3, the open center chambers 82 and 84 are generally annular and concentric with the axis of bore 25 and communicate therewith. As can be seen in FIG. 3, chambers 82 and 84 are parallel with each other but are inclined with respect to the axis of the bore 25. While the angle of intersection between the chambers and the axis of bore 25 can be varied to suit particular operating circumstances, I have found that by inclining the chambers at approximately 15 to 40 degrees with respect to the axis of the bore 25, satisfactory results are provided for many applications.

Chamber 82 includes an outer wall 92 and an inner wall 88. The walls 88 and 92 are both inclined with respect to the axis of the bore 25 and are parallel to each other. As can be seen in FIGS. 2 and 3, the inner wall 88 of chamber 82 forms one edge of port 86 and coacts with the left edge of recess 29 of the spool 24 to control the flow of hydraulic fluid through the port 86 when the spool 24 is moved to the right in the figures.

The chamber 84 includes parallel outside and inside side walls 94 and 90 respectively each of which is inclined with respect to the axis of bore 25. The walls 90 and 94 preferably parallel with the walls 88 and 92 of the chamber 82. The wall 90 of chamber 84 forms the right side edge of port 86, as shown in the figures, and it is this edge of port 86 which coacts with the right side edge of recess 29 of the spool to control the flow of hydraulic fluid through the open center port 86 when the spool 24 is moved to the left in the figures. It will therefore be understood that as the spool 24 is moved slowly to the left, the right edge of the recess 29 engages a gradually increased portion of the edge 90 of the port 86 thereby gradually and continuously reducing the flow of fluid through the port, but also as the spool is moved slowly to the right in the figures, the left edge of the recess 29 will engage a gradually increasing portion of the edge 88 of the port 86 thereby gradually and continuously reducing the flow of fluid through the port 86. When the spool 24 is positioned in the normal central position, as shown in the figures and as determined by the yieldable retaining means or spring 28, the port 86 is, of course, fully open thereby permitting free flow of hydraulic fluid therethrough.

It has been found that the inclination of the outer walls 92 and 94 of the chambers 82 and 84 respectively, will satisfactorily eliminate significant unbalance of hydraulic pressures radially against the sides of the spool 24 which, of course, if allowed to exist could seriously interfere with the free movement of the spool through the bore 25. It has therefore been found that the valve will operate with surprisingly little manual pressure even under relatively high operating pressures. The spool will move easily within the bore even under pressures on the order of 3,000 lbs. per sq. inch.

As explained hereinabove, a suitable pressure source is connected across ports 21 and 23. From port 21 fluid passes through the passage 77 into the open center passage 76 which communicates with the open center ports 86. When all of the spools are in the central undeflected position, as shown in FIG. 3, hydraulic fluid passes through valve 15, valve 13 and valve 12 and then through a passage 78 downwardly to the end of passage 46 which communicates with the outlet 23. Also communicating with the inlet 21, is the pressure core opening 71.

Thus, during operation with the control valve handles in the central position, the valve spools will each be in a central position as shown in the figures. Under these conditions, the hydraulic fluid will flow readily from the inlet 21 through the open center passage 76, through each of the open center ports 86 and finally through the outlet passage 46 and outlet 23. Under these conditions, no pressure will be produced in the pressure core chamber 71. When, however, one of the spools 24 is moved to the left in the figure, the right edge of the recess 29 of that spool will engage the port 86 thereby closing the port. Simultaneously ports 58 and 40 will be opened.

The gradual closing of the open center port 86 will thus cause a gradual increase in the pressure passage 71. When the pressure increases sufficiently in passage 71, valve 70 will be forced off its seat and hydraulic fluid will then pass downwardly through passage 62, through port 58 and out of actuator port 16. The fluid returned from the actuator will flow in through the actuator port 14, through port 40 then through passage 44 and into outlet passage 46 and finally through the outlet port 23 to the inlet of the pressure source.

Thus, as can be seen, although the ports between the actuator and the pressure opening 71 and outlet opening 46 will normally open relatively suddenly, the angled port 86 will provide flow control for these ports.

When the valve spool 24 is moved slowly to the right in the figures, coaction between the left edge of recess 29 and the wall 88 of the port 86 will provide fluid flow control sufficient to allow a gradual pressure increase in the passage 71. The hydraulic fluid will then pass through port 64 out through port 14 to the actuator. Fluid returned from the actuator will enter the valve through port 16 and pass through port 52 and will then flow out of the valve through passage 46 and port 23.

Referring now to FIG. 4 which shows a portion of the sand core used in casting the valve housing embodying the present invention, there is shown a cylindrical core C100 having a circumferential ring C50 integral therewith which forms the annular chamber 50 of the valve. Extending upwardly from the ring C50 is a portion C54 which forms the passage 54. Spaced axially of the ring C50 is a second ring C60 and extension C62 which forms the chamber 60 and passage 62 respectively. At the other end of the portion of the core shown in the figure, is a circumferential ring C38 and extension C42 which form the chamber 38 and 42 of the valve respectively. Spaced inwardly thereof is still another ring C66 and extension C68 which form the chamber 66 and passage 68 respectively.

As will be understood, in the process of molding this core it is necessary to separate the halves of the core box in a plane extending through the axis of the core C100, and also extending through the axis of each of the extensions C54, C62, C68 and C42. In other words, the plane of separation must be perpendicular to the plane of the paper of FIG. 4.

Between these above described portions of the core is another portion C102 which forms the open center of the valve. This portion of the core includes a pair of inclined spaced apart rings C84 and C82 which form the open center chambers 84 and 82 respectively. Extending laterally from the rings are a pair of extensions, designated C76. These extensions form the open center passage of the finished valve. As can be seen in the drawings, the above mentioned parting line for the core box cannot be used for the center portion C102 of the core because of the inclination of the rings C84 and C82, I have found however that this problem can be avoided by forming the center section C102 as a unit separate from the remainder of the core. Center section C102 is provided at opposite ends thereof with extensions designated C104 and C106.

To form the finished core, core portion C102 is formed first and is placed in the core box used for molding the remainder of the core. The sand and resin mixture is then blown into the core box and becomes fused or bonded to the ends C104 and C106 of the core portion C102. The finished core is then removed from the core box.

In this way, the casting for the housing can be readily manufactured with only the minor additional operation of forming the portion C102 of the core as a separate unit. The casting thus formed is bored and honed in the usual way to form the bore 25. No machining operations other than those normally performed are required on the spool 24. For this reason, valves embodying the present invention can be manufactured at virtually the same cost as a conventional valve which does not embody a flow control provision.

A number of valves embodying the present invention have been manufactured and sold. They have proved to be economical to manufacture, rugged in construction, and reliable in operation. The flow control provision of the open center chambers and valve ports was found to provide surprisingly good flow control over a wide range of movement of the spool 24. Moreover, flow control is provided without causing significant unbalance of hydraulic forces either axially or radially against the spool. For this reason, the spool can be easily moved within the bore even under heavy hydraulic pressures such as 3,000 lbs. per. sq. inch. Although only a single port viz, the open center port, incorporates the flow control feature, flow control is provided both when the actuator port 14 is established as an outlet port by moving the spool to the right and also when the actuator port 16 is established as an outlet port by movement of the spool 24 to the left in the figures.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A hydraulic control valve comprising a housing, said housing having a bore therethrough, an inlet port, an outlet port, a plurality of axially spaced apart annular chambers communicating with said bore, a passageway leading between at least one such chamber and the outlet of said valve, a passageway communicating between at least one such chamber and the inlet of said valve and a valve element slidably mounted in said bore, said valve element having at least one recess therein, the improvement comprising a pair of spaced apart annular chambers concentric with said bore, said pair of annular chambers being inclined with respect to the axis of said bore, the portion of said housing between said pair of chambers comprising a flow control port, said flow control port including a first and second side edge, said side edges also being inclined with respect to the axis of said bore, one chamber of said pair communicating with the inlet of said valve and the other chamber of said pair communicating with the outlet of said valve, said valve element including a recess, said recess having side edges positioned substantially perpendicular to the axis of said movable valve element, said side edges being adapted to cooperate with said flow control port whereby axial movement of said valve element at a constant rate with respect to said housing gradually closes or opens said flow control port thereby controlling the flow of hydraulic fluid through said valve.

2. A spool type hydraulic control valve for controlling the operation of hydraulic actuators and the like, comprising a combination of valve housing, said housing having a bore therein, a cylindrical spool slidably mounted within said bore, a plurality of spaced apart annular chambers communicating with said bore, said housing having an inlet and an outlet port therein, said housing also including passageways communicating between each such annular chamber and one of said inlet and outlet ports, one adjacent pair of said annular chambers comprising flow control chambers and a portion of said housing between said flow control chambers comprising a flow control port, each of said flow control chambers including an outer end wall and an inner end wall, each of said outer end walls being inclined with respect to the axis of said bore and each of said inner walls being also inclined with respect to the axis of said bore, the inner end wall and the outer end wall of each of said flow control chambers being parallel to each other and the inner end walls of each such chamber comprising the side edges of said flow control port, said spool including a recess, said recess having side edges positioned perpendicular to the axis of said spool, said side edges being adapted to cooperate with said inclined side edges of said flow control port whereby movement of said spool at a uniform rate gradually closes said flow control port.

3. Flow control valve according to claim 1 wherein said spool is normally and yieldably retained in a first position wherein said recess is positioned in the center of said flow control port thereby normally allowing free flow of hydraulic fluid through said flow control port and whereby movement of said spool in either direction from said first position at a uniform rate will gradually close said flow control port.

4. A multiple stack valve comprising a plurality of adjacent valve housings, each said valve housing having a bore therein adapted to receive a slidable valve element, said stack valve having an inlet and an outlet port therein and an open center passage communicating with said inlet port, a pair of annular open center chambers concentric with each such bore, a flow control port between said pair of open center chambers, said flow control port including a pair of side edges, each such edge being inclined with respect to the axis of said bore, said pair of open center chambers being connected in series between said inlet port and said outlet port, each of said valve housings having a pair of actuator ports therein and a passageway communicating between each actuator port and said bore, a passageway communicating with said bore adjacent each said actuator passage and with said valve inlet, said spool having a plurality of recesses therein to provide communication between the adjacent passages and including a flow control recess adapted to coact with said flow control port and resilient means yieldably biasing said spool to a position wherein the flow control recess is positioned centrally of said flow control port whereby axial displacement of said spool in either direction from said normal position gradually closes said flow control port.

5. A hydraulic control valve comprising in combination, a valve housing, said housing having a bore therein, a spool slidably mounted within said bore, said spool having an axially extending recess, said housing including a pair of axially spaced apart chambers communicating with said bore, each of said chambers including axially spaced apart inward and outward end walls, each of said end walls being mutually parallel and each positioned to intersect the longitudinal axis of said bore at an inclined angle, said housing also including an inlet port communicating with one chamber of said pair and an outlet port communicating with the other chamber of said pair.

6. The apparatus of claim 5 in which the radially extending walls on the recess in the spool are perpendicular to the longitudinal axis of the spool.

7. A hydraulic control valve comprising in combination, a housing including a valve chamber, a valve element slidably mounted within said valve chamber, said housing including a pair of axially spaced apart annular chambers communicating with said valve chamber, said chambers defining a flow control port therebetween, the outward edges of said flow control port being inclined at an acute angle with respect to the axis of movement of said valve element within said valve and said valve element having an axially extending recess adapted to gradually engage the edges of said flow control port upon relative axial movement therebetween.

8. A hydraulic control valve comprising in combination, a housing having an elongated chamber therein, inlet and outlet ducts communicating with said chamber, said housing including an annular chamber positioned adjacent said elongated chamber and communicating between said elongated chamber and one of said ducts, said annular chamber including a pair of axially spaced apart parallel side walls, each of said walls being inclined at an acute angle with respect to the longitudinal axis of said elongated chamber and a valve element slidably mounted within said elongated chamber for controlling the passage of hydraulic fluid through said valve.

9. A hydraulic control valve comprising in combination, a housing, said housing having a first chamber therein, said first chamber having a side wall, a valve element slidably mounted in said first chamber, a second chamber communicating with said first chamber and positioned adjacent the side wall thereof, said second chamber including two axially spaced apart walls extending radially of said bore, both of said walls of said second chamber being inclined with respect to the axis of movement of said valve element in said first chamber, said housing including a duct communicating with said second chamber, said valve element including a wall portion extending inwardly from the outward edge thereof toward the center thereof, said wall portion of said valve element being positioned to intersect said walls of said second chamber at an acute angle whereby movement of said valve element within said first chamber will gradually open or close said duct.

10. A hydraulic control valve comprising in combination, a housing, said housing having a valve chamber therein, said chamber having side walls, said housing having first and second port means, first duct means communicating between said first port means and said chamber, second duct means communicating between said chamber and said second port means, said housing also including at least one wall communicating between said valve chamber and said first duct and intersecting the side walls of said valve chamber at an inclined angle with respect to the longitudinal axis of said valve chamber, a valve element slidably mounted within said chamber for controlling the flow of hydraulic fluid through said valve, said valve element including a sealing portion having a relatively large cross section and adapted to fit in sealing relationship within said valve chamber and a transverse wall portion at one end of said sealing portion, said transverse wall portion being positioned on said valve element to intersect said housing wall at an acute angle whereby said transverse wall portion will coact with said housing wall to gradually reduce the opening between said first duct and said valve chamber.

11. In a fluid control valve, a body member having a pair of chambers connected by a bore which intersects axially spaced relatively adjacent end walls of the chambers, a spool slidably mounted in the bore for controlling the fluid flow from one chamber to the other, the said end wall of one of the chambers being disposed at an acute angle with respect to the axis of the bore, and the spool having a cylindrical portion providing a circular edge disposed in a plane perpendicular to the axis of the bore for gradually intersecting the aforesaid acutely angled chambed wall as the spool is moved axially in the bore and to thereby gradually control the fluid flow between the chambers.

12. A hydraulic control valve comprising in combination, a valve housing, said housing having a bore therein, a spool slidably mounted within said bore, said spool having an axially extending recess, said housing including a pair of axially spaced apart chambers communicating with said bore, each of said chambers including axially spaced apart inward and outward end walls, the inward end walls of said chambers being disposed adjacent one another and being inclined at an angle to the longitudinal axis of said bore so as to define an axially extending port intermediate said chambers, the axial length of said port being dimensioned to coact with the recess in said spool whereby axial displacement of said recess in either direction gradually closes said port, said housing also including a first duct communicating with one of said chambers and a second duct communicating with the other of said chambers.

13. A hydraulic control valve comprising in combination, a housing, said housing having a valve chamber therein, a cylindrical valve element mounted for reciprocal movement within said chamber, said element having an axially extending recess and said recess having end walls substantially perpendicular to the longitudinal axis of said element, said housing including first and second ducts communicating with said chamber at axially spaced apart annular chambers therein, said housing including a flow control port between said chambers in which said first and second ducts communicate with said valve chamber, the edges of said flow control port adjacent said first and second ducts being positioned parallel to each other and inclined at an acute angle with respect to the axis of movement of said valve element within said chamber.

References Cited by the Examiner

UNITED STATES PATENTS

| | | | |
|---|---|---|---|
| 525,462 | 9/94 | Jones | 137—625.69 |
| 900,045 | 9/08 | Thomas | 91—384 X |
| 1,292,013 | 1/19 | Munger | 137—625.67 |
| 1,774,213 | 8/30 | Tagliaferri | 91—461 |
| 2,000,805 | 5/35 | West et al. | 91—438 X |
| 2,380,705 | 7/45 | Proctor | 137—333 |
| 2,702,529 | 2/55 | Doerfner | 137—625.69 |
| 2,873,762 | 2/59 | Tennis | 137—596.13 |
| 2,958,340 | 11/60 | Rosebrook | 137—625.69 |
| 2,971,536 | 2/61 | Junck et al. | 91—446 X |

M. CARY NELSON, *Primary Examiner.*

KARL J. ALBRECHT, MILTON KAUFMAN,
*Examiners.*